(12) United States Patent
Amini et al.

(10) Patent No.: US 11,006,254 B2
(45) Date of Patent: *May 11, 2021

(54) ADJUSTING BACKHAUL AND FRONTHAUL COMMUNICATIONS IN A WIRELESS MESH NETWORK

(71) Applicant: NETGEAR, Inc., San Jose, CA (US)

(72) Inventors: Peiman Amini, Mountain View, CA (US); Joseph Amalan Arul Emmanuel, Cupertino, CA (US)

(73) Assignee: NETGEAR, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/572,126

(22) Filed: Sep. 16, 2019

(65) Prior Publication Data

US 2020/0013267 A1 Jan. 9, 2020

Related U.S. Application Data

(63) Continuation of application No. 15/590,829, filed on May 9, 2017, now Pat. No. 10,417,887.
(Continued)

(51) Int. Cl.
*H04W 12/00* (2021.01)
*H04W 4/30* (2018.01)
(Continued)

(52) U.S. Cl.
CPC ............ *H04W 4/30* (2018.02); *G01S 5/0289* (2013.01); *G01S 5/0294* (2013.01); *G01S 19/46* (2013.01); *G08B 13/2494* (2013.01); *H04B 1/005* (2013.01); *H04B 1/713* (2013.01); *H04B 17/0085* (2013.01); *H04B 17/318* (2015.01); *H04B 17/345* (2015.01); *H04L 5/003* (2013.01); *H04L 12/4633* (2013.01);
(Continued)

(58) Field of Classification Search
CPC ....... H04L 45/00; H04L 45/125; H04L 45/20; H04L 45/22; H04W 40/02; H04W 40/12; H04W 40/22; H04W 88/04; H04W 40/10; H04W 40/246; H04W 40/26; H04W 40/30; H04W 40/32; H04W 48/16; H04W 16/26; H04W 84/047; H04W 24/02; H04W 84/045; H04B 7/2606
See application file for complete search history.

(56) References Cited

U.S. PATENT DOCUMENTS

| 9,338,638 B1 * | 5/2016 | Palin ................. H04W 4/80 |
| 10,044,426 B1 | 8/2018 | Pawar et al. |

(Continued)

FOREIGN PATENT DOCUMENTS

| CN | 1354924 A | 6/2002 |
| CN | 101390029 A | 3/2009 |

(Continued)

*Primary Examiner* — Jung Liu
(74) *Attorney, Agent, or Firm* — Perkins Coie LLP (57) ABSTRACT

Adjusting backhaul and fronthaul communication links of wireless mesh networks are described. A wireless mesh network has a topology including fronthaul communication links and backhaul communication links. In one aspect, characteristics of network data packets transmitted within a wireless mesh network can be identified. Based on those characteristics, the topology of the wireless mesh network can change.

20 Claims, 5 Drawing Sheets

Related U.S. Application Data (60) Provisional application No. 62/406,325, filed on Oct. 10, 2016.

(51) Int. Cl.

| | |
|---|---|
| *H04W 4/02* | (2018.01) |
| *H04W 4/029* | (2018.01) |
| *H04W 76/11* | (2018.01) |
| *H04W 16/26* | (2009.01) |
| *G08B 13/24* | (2006.01) |
| *H04L 12/26* | (2006.01) |
| *H04L 12/24* | (2006.01) |
| *H04W 12/08* | (2021.01) |
| *H04W 36/00* | (2009.01) |
| *H04W 36/36* | (2009.01) |
| *H04W 36/16* | (2009.01) |
| *H04W 28/04* | (2009.01) |
| *H04B 17/318* | (2015.01) |
| *H04W 28/02* | (2009.01) |
| *H04W 72/04* | (2009.01) |
| *H04W 84/12* | (2009.01) |
| *H04L 29/08* | (2006.01) |
| *H04W 36/24* | (2009.01) |
| *H04W 36/32* | (2009.01) |
| *H04W 36/38* | (2009.01) |
| *H04W 4/70* | (2018.01) |
| *H04W 4/80* | (2018.01) |
| *H04L 12/46* | (2006.01) |
| *H04B 1/00* | (2006.01) |
| *H04B 1/713* | (2011.01) |
| *H04L 5/00* | (2006.01) |
| *H04W 80/06* | (2009.01) |
| *H04W 84/04* | (2009.01) |
| *H04W 84/10* | (2009.01) |
| *H04B 17/345* | (2015.01) |
| *H04B 17/00* | (2015.01) |
| *G01S 5/02* | (2010.01) |
| *G01S 19/46* | (2010.01) |
| *H04W 36/20* | (2009.01) |
| *H04W 72/08* | (2009.01) |
| *H04W 84/18* | (2009.01) |
| *H04W 48/02* | (2009.01) |
| *H04W 76/15* | (2018.01) |
| *H04W 12/61* | (2021.01) |
| *H04W 12/63* | (2021.01) |
| *H04L 12/751* | (2013.01) |
| *H04W 88/08* | (2009.01) |
| *H04W 88/10* | (2009.01) |
| *H04W 92/20* | (2009.01) |
| *H04B 1/715* | (2011.01) |
| *H04W 40/24* | (2009.01) |
| *H04W 8/00* | (2009.01) |
| *H04W 28/18* | (2009.01) |
| *H04W 72/12* | (2009.01) |

(52) U.S. Cl.
CPC .............. *H04L 41/12* (2013.01); *H04L 43/08* (2013.01); *H04L 43/0864* (2013.01); *H04L 43/0888* (2013.01); *H04L 43/16* (2013.01); *H04L 67/303* (2013.01); *H04W 4/02* (2013.01); *H04W 4/029* (2018.02); *H04W 4/70* (2018.02); *H04W 4/80* (2018.02); *H04W 12/08* (2013.01); *H04W 16/26* (2013.01); *H04W 28/0236* (2013.01); *H04W 28/0289* (2013.01); *H04W 28/04* (2013.01); *H04W 36/0055* (2013.01); *H04W 36/0072* (2013.01); *H04W 36/0083* (2013.01); *H04W 36/0094* (2013.01); *H04W 36/16* (2013.01); *H04W 36/20* (2013.01); *H04W 36/245* (2013.01); *H04W 36/32* (2013.01); *H04W 36/36* (2013.01); *H04W 36/38* (2013.01); *H04W 72/0453* (2013.01); *H04W 72/082* (2013.01); *H04W 76/11* (2018.02); *H04W 80/06* (2013.01); *H04W 84/045* (2013.01); *H04W 84/105* (2013.01); *H04W 84/12* (2013.01); *H04B 2001/7154* (2013.01); *H04L 45/02* (2013.01); *H04W 4/023* (2013.01); *H04W 8/005* (2013.01); *H04W 12/61* (2021.01); *H04W 12/63* (2021.01); *H04W 28/18* (2013.01); *H04W 40/246* (2013.01); *H04W 48/02* (2013.01); *H04W 72/1231* (2013.01); *H04W 76/15* (2018.02); *H04W 84/18* (2013.01); *H04W 88/08* (2013.01); *H04W 88/10* (2013.01); *H04W 92/20* (2013.01)

(56) References Cited

U.S. PATENT DOCUMENTS

| | | |
|---|---|---|
| 2004/0264379 A1 | 12/2004 | Srikrishna et al. |
| 2008/0181133 A1* | 7/2008 | Thubert ................ H04W 40/30 370/255 |
| 2009/0029645 A1* | 1/2009 | Leroudier ........... H04W 84/047 455/7 |
| 2010/0137021 A1* | 6/2010 | Sharret ................ H04W 88/04 455/550.1 |
| 2012/0258749 A1* | 10/2012 | Lenzini ................ H04W 16/14 455/509 |
| 2014/0003409 A1* | 1/2014 | Van De Laar ........ H04W 76/10 370/338 |
| 2014/0071937 A1* | 3/2014 | Klatt ...................... H04L 5/001 370/330 |
| 2014/0126534 A1 | 5/2014 | Larsson et al. |
| 2015/0103663 A1 | 4/2015 | Amini et al. |
| 2016/0095108 A1 | 3/2016 | Ryoo et al. |
| 2016/0100437 A1* | 4/2016 | Armstrong ........... G05B 11/012 370/249 |
| 2016/0157221 A1 | 6/2016 | Kim et al. |
| 2016/0198350 A1 | 7/2016 | Lou et al. |
| 2016/0212745 A1* | 7/2016 | Hiertz ................... H04W 16/32 |
| 2016/0234807 A1* | 8/2016 | Levy ................... H04W 72/005 |
| 2017/0006499 A1 | 1/2017 | Hampel et al. |
| 2017/0017214 A1 | 3/2017 | Vora et al. |
| 2017/0064042 A1* | 3/2017 | Vora ........................ H04W 4/70 |
| 2017/0094575 A1* | 3/2017 | Bercovici ............. H04W 36/14 |
| 2017/0094681 A1 | 3/2017 | Takeda et al. |
| 2017/0164323 A1 | 6/2017 | Markhovsky et al. |
| 2017/0332439 A1 | 11/2017 | Savolainen et al. |
| 2018/0007673 A1 | 1/2018 | Fwu et al. |

FOREIGN PATENT DOCUMENTS

| | | |
|---|---|---|
| CN | 101401482 A | 4/2009 |
| CN | 101626575 A | 1/2010 |
| CN | 102742338 A | 10/2012 |
| CN | 103414746 A | 11/2013 |
| CN | 103703850 A | 4/2014 |
| CN | 104094564 A | 10/2014 |
| CN | 104320314 A | 1/2015 |
| CN | 104579610 A | 4/2015 |
| WO | 2012152430 A1 | 11/2012 |

\* cited by examiner

ADJUSTING BACKHAUL AND FRONTHAUL COMMUNICATIONS IN A WIRELESS MESH NETWORK

CROSS-REFERENCE TO RELATED APPLICATIONS

This application is a continuation of U.S. patent application Ser. No. 15/590,829, filed on May 9, 2017, issued as U.S. Pat. No. 10,417,887, entitled "Backhaul and Fronthaul Communications in a Wireless Mesh Network", which application claims priority to U.S. Provisional Patent Application No. 62/406,325, filed on Oct. 10, 2016, entitled "Distributed Multi-Band Wireless Networking System", each of which are incorporated herein by reference in their entirety.

TECHNICAL FIELD

The disclosure relates to wireless networks, and in particular backhaul and fronthaul communication links of wireless mesh networks.

BACKGROUND

With the evolving technologies of wireless networks, embedded systems, the Internet, etc. there is an increasing demand for increased network coverage, increased network bandwidth, higher network speeds, etc. from electronic devices. This is particularly relevant with digital content having become extensively used in shared, networked environments. As a result, wireless data traffic has experienced enormous growth.

Wireless mesh networks include multiple devices grouped together to implement a wireless network (e.g., the Institute of Electrical and Electronics Engineers (IEEE) 802.11 standards implementing a wireless local area network (WLAN)) that can provide better network coverage than a single device providing a router and access point. The multiple devices can be organized into a topology representing different nodes of the wireless mesh network. One of the nodes can be an access point (e.g., providing access to the Internet) and router. The other nodes can be satellites that receive and provide data with client devices (e.g., laptops, smart phones, video game consoles, televisions, etc.) connected to the wireless mesh network. The data is transmitted among the satellite nodes and the access point node.

Backhaul communication links among the nodes can be used to transfer data between the access point node and the satellite nodes. Fronthaul communication links can be used to transfer data between the satellite nodes and the client devices. However, the performance of the wireless mesh network is affected by the selection of channels and/or bands for the backhaul communication links and the fronthaul communication links. Additionally, the topology of the nodes can also affect the performance of the wireless mesh network.

SUMMARY

Some of the subject matter described herein includes a method for adjusting communication links of a wireless mesh network including determining, by a first computing node of the wireless mesh network, characteristics of network data packets associated with a first client device of the wireless mesh network; and adjusting, by the first computing node, one or both of a first fronthaul communication link or a first backhaul communication link of the wireless mesh network based on the characteristics of the network data packets, the first fronthaul communication link representing a communication link established between the first computing node and the first client device, the first backhaul communication link representing a communication link established between the first computing node and a second computing node of the wireless mesh network.

In some implementations, wherein adjusting one or both of the first fronthaul communication link or a first backhaul communication link includes changing the first fronthaul communication link to operate from within a first frequency band to a second frequency band, and changing the first backhaul communication link to operate from within the second frequency band to the first frequency band, the first frequency band and the second frequency band being different.

In some implementations, adjusting one or both of the first fronthaul communication link or a first backhaul communication link includes changing the first fronthaul communication link to operate from within a first channel of a frequency band to a second channel of the frequency band, and changing the first backhaul communication link to operate from within the second channel of the frequency band to the first channel of the frequency band, the first channel and the second channel being different.

In some implementations, wherein adjusting one or both of the first fronthaul communication link or a first backhaul communication link includes adjusting one or both of a frequency band or a channel of one or both of the first fronthaul communication link or the first backhaul communication link.

In some implementations, the characteristics include one or more of a type of the first client device, a type of application corresponding to the network data packets, or a time duration of the application corresponding to the network data packets, the application representing how the network data packets are to be used by the first client device.

In some implementations, adjusting one or both of the first fronthaul communication link or a first backhaul communication link includes changing a topology of the wireless mesh network based on the characteristics of the network data packets.

In some implementations, changing the topology of the wireless mesh network includes changing the first backhaul communication link from establishing a communication link between the first computing node and the second computing node to a communication link between the second computing node and a third computing node.

Some of the subject matter described herein includes an electronic device, including one or more processors; and memory storing instructions, wherein the processor is configured to execute the instructions such that the processor and memory are configured to determine characteristics of network data packets associated with a first client device of a wireless mesh network; and adjust one or both of a first fronthaul communication link or a first backhaul communication link of the wireless mesh network based on the characteristics of the network data packets, the first fronthaul communication link representing a communication link established between the first computing node and the first client device, the first backhaul communication link representing a communication link established between the first computing node and a second computing node of the wireless mesh network.

In some implementations, wherein adjusting one or both of the first fronthaul communication link or a first backhaul communication link includes changing the first fronthaul communication link to operate from within a first frequency band to a second frequency band, and changing the first backhaul communication link to operate from within the second frequency band to the first frequency band, the first frequency band and the second frequency band being different.

In some implementations, adjusting one or both of the first fronthaul communication link or a first backhaul communication link includes changing the first fronthaul communication link to operate from within a first channel of a frequency band to a second channel of the frequency band, and changing the first backhaul communication link to operate from within the second channel of the frequency band to the first channel of the frequency band, the first channel and the second channel being different.

In some implementations, adjusting one or both of the first fronthaul communication link or a first backhaul communication link includes adjusting one or both of a frequency band or a channel of one or both of the first fronthaul communication link or the first backhaul communication link.

In some implementations, the characteristics include one or more of a type of the first client device, a type of application corresponding to the network data packets, or a time duration of the application corresponding to the network data packets, the application representing how the network data packets are to be used by the first client device.

In some implementations, adjusting one or both of the first fronthaul communication link or a first backhaul communication link includes changing a topology of the wireless mesh network based on the characteristics of the network data packets.

In some implementations, changing the topology of the wireless mesh network includes changing the first backhaul communication link from establishing a communication link between the first computing node and the second computing node to a communication link between the second computing node and a third computing node.

Some of the subject matter described herein includes computer program product, comprising one or more non-transitory computer-readable media having computer program instructions stored therein, the computer program instructions being configured such that, when executed by one or more computing devices, the computer program instructions cause the one or more computing devices to determine characteristics of network data packets associated with a first client device of a wireless mesh network; and adjust one or both of a first fronthaul communication link or a first backhaul communication link of the wireless mesh network based on the characteristics of the network data packets, the first fronthaul communication link representing a communication link established between the first computing node and the first client device, the first backhaul communication link representing a communication link established between the first computing node and a second computing node of the wireless mesh network.

In some implementations, adjusting one or both of the first fronthaul communication link or a first backhaul communication link includes changing the first fronthaul communication link to operate from within a first frequency band to a second frequency band, and changing the first backhaul communication link to operate from within the second frequency band to the first frequency band, the first frequency band and the second frequency band being different.

In some implementations, adjusting one or both of the first fronthaul communication link or a first backhaul communication link includes changing the first fronthaul communication link to operate from within a first channel of a frequency band to a second channel of the frequency band, and changing the first backhaul communication link to operate from within the second channel of the frequency band to the first channel of the frequency band, the first channel and the second channel being different.

In some implementations, adjusting one or both of the first fronthaul communication link or a first backhaul communication link includes adjusting one or both of a frequency band or a channel of one or both of the first fronthaul communication link or the first backhaul communication link.

In some implementations, the characteristics include one or more of a type of the first client device, a type of application corresponding to the network data packets, or a time duration of the application corresponding to the network data packets, the application representing how the network data packets are to be used by the first client device.

In some implementations, adjusting one or both of the first fronthaul communication link or a first backhaul communication link includes changing a topology of the wireless mesh network based on the characteristics of the network data packets, wherein changing the topology of the wireless mesh network includes changing the first backhaul communication link from establishing a communication link between the first computing node and the second computing node to a communication link between the second computing node and a third computing node.

DETAILED DESCRIPTION

This disclosure describes techniques for configuring backhaul and fronthaul communication links of wireless mesh networks based on characteristics of network data packets provided to and received from client devices. In one example, a wireless mesh network can include an access point node communicating with satellite nodes via backhaul communication links to implement a wireless mesh network. The satellite nodes can communicate with user devices (e.g., laptops, smart phones, video game consoles, televisions, etc.) connecting to the wireless mesh network using fronthaul communication links. The backhaul and fronthaul communication links can use different bands (e.g., 2.4 GHz, 5 GHz low band, 5 GHz high band, etc.) and/or channels within the bands of the electromagnetic spectrum. For example, each of the bands can be composed of channels representing sub-divisions of the bands that can be selected for the backhaul and fronthaul communications. The bands and/or channels selected for the backhaul communication links and the fronthaul communication links can be selected based on the network data packets of data for client devices. For example, characteristics of the network data packets such as the type of data of the network data packets (e.g., network packets corresponding to video playback) can be determined and used to change or adjust the bands or channels of backhaul communication links and/or fronthaul communication links.

In some implementations, the fronthaul communication links or the backhaul communication links can switch the bands that they operate within, for example, by the satellite node using a different radio for those communication links. In another implementation, the satellite node might switch the channels that the fronthaul and backhaul communication links operate within. For example, a fronthaul communication link and a backhaul communication link might operate at different channels of the same band. In another example, the topology of the wireless mesh network can be changed based on the type of data of the network data packets. For example, the backhaul communication link can be adjusted such that a satellite node communicates with another satellite node instead. As discussed below, these techniques can improve the performance of the wireless mesh network.

Figure 1:
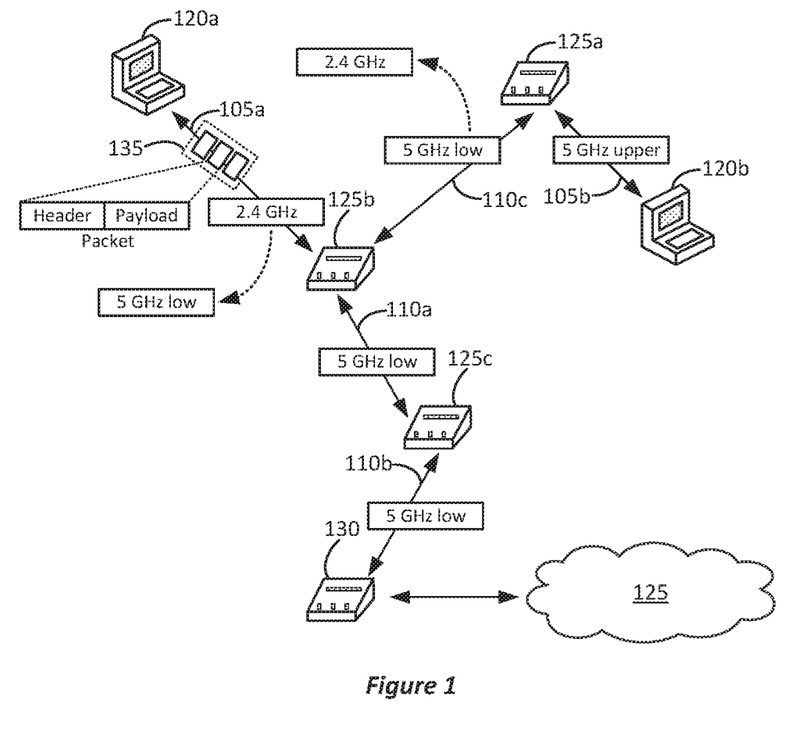
FIG. 1 illustrates an example of a wireless mesh network with configurable backhaul and fronthaul communication links based on characteristics of network data packets.

In more detail, FIG. 1 illustrates an example of a wireless mesh network with configurable backhaul and fronthaul communication links based on network data packet characteristics. In FIG. 1, access point node 130 and satellite nodes 125a-c implement a wireless mesh network that client devices 120a and 120b can connect with to receive data from and provide data to another network such as Internet 125. For example, fronthaul communication links 105a and 105b can be established to provide communications between client device 120a and satellite node 125b, and between client device 120b and satellite node 125a, respectively. Backhaul communication links 110a, 110b, and 110c can also be established to provide communications between satellite nodes 125a-c and access point 130. The organization of nodes and communications links between them represents a topology for the wireless mesh network. For example, which node another node (or client device) communicates with represents a portion of the topology. In FIG. 1, the satellite nodes are arranged in a hierarchy with some satellite nodes providing data back to a lower level of the hierarchy until the data is provided to access point node 130. In other topologies, other types of arrangements may be established (e.g., rings, trees, etc.). In some implementations, access point 130 can also provide the functionality of a satellite node (e.g., provide data and receive data from a client device using a frontline communication link).

In FIG. 1, fronthaul communication link 105b can be established by access point node 125a to operate at the 5 GHz upper band such that data can be transmitted back-and-forth between access point node 125a and client device 120b using signals operating within that band. Fronthaul communication link 105a can be established by access point node 125b at the 2.4 GHz band. By contrast, backhaul communication links 110a-c can be established to operate at a different band than the fronthaul communication links 105a and 105b such as within the 5 GHz lower band. Though the example uses different bands, in other implementations, backhaul communication links 110a-c and fronthaul communication links 105a and 105b can be established using different channels within the same band. The communication links can be established using radios and antennas. For example, different radios can be used to generate signals for the different bands and transmitted with antennas.

Backhaul communication links 110a-c and fronthaul communication links 105a and 105b can implement a mesh network transmitting network data packets among the various nodes and client devices. For example, in FIG. 1, client device 120a may be streaming media content (e.g., a video) from a media streaming service accessible by Internet 125. As a result, network data packets 135 can be transmitted from client device 120a to access point node 130 by fronthaul communication link 105a to satellite node 125b, by backhaul communication link 110a to satellite node 125c, and by backhaul communication link 110b to access point 130 and onward to Internet 125. Network data packets can be received by access point 130 and provided to client device 120a in a reversed manner.

In some implementations, the characteristics of network data packets can be analyzed by a satellite node (or the access point node) and the results of that analysis can be used to adjust the configurations of fronthaul communication links and/or backhaul communication links. This can include adjusting the band and/or channel being used by fronthaul or backhaul communication links. Additionally, this can also include adjusting the topology of the wireless mesh network such that a link between nodes is changed.

For example, in FIG. 1, satellite node 125 receives network data packets 135 from client device 120a. Each of the network data packets can include a header and a payload as depicted in FIG. 1. The header can indicate data for delivering and processing the network data packet (e.g., source and destination network addresses, a checksum for error detection, etc.). The payload can include the user data for an application (e.g., bits of video content if client device 120a is streaming video content).

As satellite node 125 receives network data packets 135, it can determine their characteristics, such as the type of device of client device 120a (e.g., a smartphone, or even a particular type of brand of smartphone), the type of application running on client device 120a that network data packets 135 are associated with (e.g., video streaming software), what network data packets 135 are being used for (e.g., video streaming), how long network data packets are being received (e.g., the time duration that network data packets corresponding to video streaming have been received without an interruption outside a threshold time range or beyond a threshold time), etc. For example, deep packet inspection (DPI) can be performed to analyze the header and payload to determine the characteristics using a variety of techniques including string matching, regular expressions, etc. to determine patterns in the bits of the payload that can be used to determine the aforementioned characteristics. Based on those determined characteristics, the bands and/or channels being used by backhaul communication links and/or fronthaul communication links can be adjusted to different bands and/or channels. For example, the radio used to generate the communication links can be switched to radios corresponding to the different bands.

For example, as depicted with the dotted arrow line in FIG. 1, fronthaul communication link 105a can be changed from the 2.4 GHz band to the 5 GHz lower band. Additionally, backhaul communication link 110c can be changed from the 5 GHz lower band to the 2.4 GHz band. That is, a fronthaul communication link and a backhaul communication link used by satellite node 125b can be adjusted to different bands by exchanging the bands used by those links. In this example, the fronthaul communication link is provided the band with the higher bandwidth so that it can have a higher data throughput. In some implementations, the fronthaul communication link and the backhaul communication link can be within the same bands, but the channels may be adjusted to different channels.

In other implementations, the topology of the mesh network implemented by satellite nodes 125a-c and access point 130 can be adjusted. For example, in FIG. 1, backhaul communication link 110c provides communications between access point 125a and 125b. However, based on the characteristics of the network data packets, the topology of the mesh network can be adjusted by establishing backhaul communication link 110c to be between satellite node 125a and satellite node 125c rather than between satellite node 125a and satellite node 125b.

Adjusting backhaul communication links and fronthaul communication links, or the topology of the mesh network based on characteristics of the network data packets can improve the performance of the mesh network. For example, if the network data packets received on a fronthaul communication link are being used for video streaming and the network data packets received on a backhaul communication link are being used for file sharing by another client device, then the bands being used for the fronthaul communication link and the backhaul communication link can be adjusted such that the fronthaul communication link is provided the band with a higher bandwidth to allow for increased throughput if video streaming is to be prioritized. As a result, the experience of the client device using the mesh network can be improved.

Figure 2:
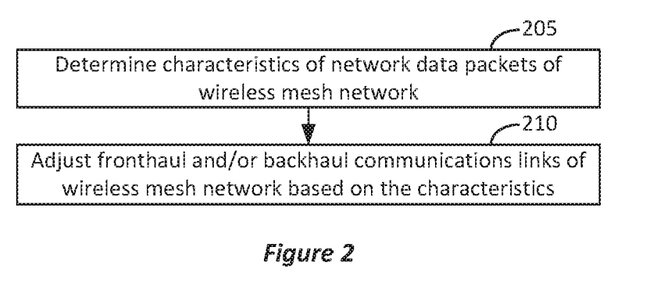
FIG. 2 illustrates an example of a block diagram for configuring backhaul and fronthaul communication links of a wireless mesh network based on network data packet characteristics.

FIG. 2 illustrates an example of a block diagram for configuring backhaul and fronthaul communication links of a wireless mesh network based on network packet characteristics. In block 205, characteristics of network data packets of the wireless mesh network can be determined. For example, deep packet inspection (DPI) can be used to analyze the header and/or the payload of the network data packets to determine their characteristics. DPI can include performing string matching (e.g., Aho-Corasick, Commentz-Walter, Wu-Manber algorithms), regular expression matching (e.g.; deterministic finite automation (DFA), spanning trees, etc.), etc. to determine patterns in the bits of the payload.

Figure 3:
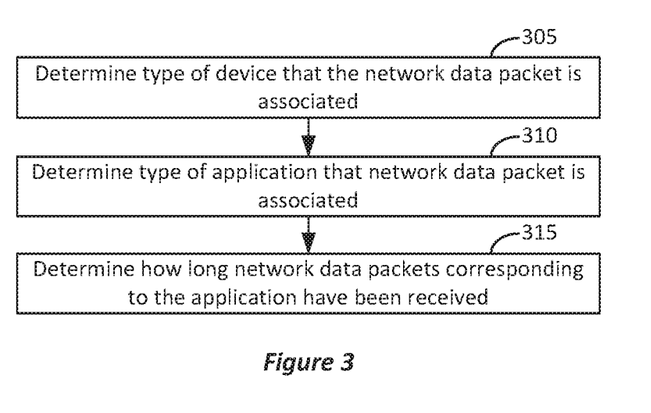
FIG. 3 illustrates an example of a block diagram for determining characteristics of network data packets.

FIG. 3 illustrates an example of a block diagram for determining characteristics of network data packets. In FIG. 3, at block 305, the type of device that the network data packet is associated with can be determined. For example, the type of device of client device 120a in FIG. 1 can be determined by analyzing the header and/or payload of network data packets 135. The type of device can be a smartphone, laptop, video game console, desktop computer, tablet, smartwatch, or other type of electronic device. In some implementations, the type of device can be more particular, for example, the type of smartphone, the brand of the smartphone, etc.

At block 310, the type of application that the network data packets are being used for can be determined. For example if client device 120a in FIG. 1 is streaming video content, then network data packets 135 can be determined to include payloads including bits for video content playback. As another example, network data packets 135 might be used for voice over internet protocol (VoIP) applications to provide voice communications between client device 120a and another device over Internet 125 and the wireless mesh network. As another example, network data packets 135 might be determined to be for music streaming (e.g., audio data). As such, how the network data packets are to be used by a client device can be determined as a characteristic.

At block 315, how long the network data packets for the application are being received can be determined. For example, the time duration (e.g., three hours, thirty minutes) that the streaming video-related network data packets 135 being transmitted to and from client device 120a can be determined. The time duration that network data packets 135 are being received for that particular application can be an indication as to the length of a connection from client device 120a to a server accessible by Internet 125 via the mesh network implemented by access point node 130 and satellite nodes 125a-c.

Returning to FIG. 2, at block 210, the fronthaul communication links and/or the backhaul communication links of the wireless mesh network may be adjusted based on the determined characteristics. For example, as previously discussed regarding FIG. 1, a fronthaul communication link and a backhaul communication link used by satellite node 125b can be adjusted to different bands, for example, by exchanging the bands used by those links. In other implementations, the bands can be switched without exchanging, for example, one can be switched from the 2.4 GHz band to the 5 GHz upper band and the other can be switched from the 5 GHz upper band to the 5 GHz lower band.

Figure 4:
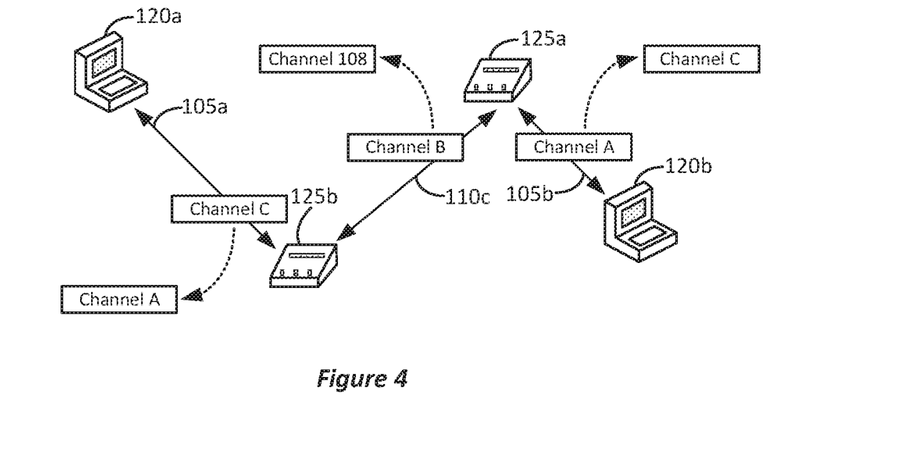
FIG. 4 illustrates an example of configuring backhaul and fronthaul communication links based on priorities of network data packets.

In some implementations, the characteristics of the network data packets can be used to determine a priority. Network data packets in a fronthaul communication link that have a higher priority than network data packets in a backhaul communication link can be prioritized by providing the fronthaul communication with a band or channel with a higher or better data throughput, and vice versa. FIG. 4 illustrates an example of configuring backhaul and fronthaul communication links based on priorities of network data packets. In FIG. 4, fronthaul communication link 105a can be operating at channel A (e.g., channel 100 of the 5 GHz upper band), backhaul communication link 110c can be operating at channel B (e.g., channel 104 of the 5 GHz upper band), and fronthaul communication link 105b can be operating at channel C (e.g., channel 108 of the 5 GHz upper band). Satellite node 125b can receive network data packets from fronthaul communication link 105a and backhaul communication link 110c. The network data packets received via backhaul communication link 110c can include network data packets provided by or intended for client device 120b which communicates with satellite node 125a via fronthaul communication link 105b.

Satellite node 125b can receive the network data packets from fronthaul communication link 104a and backhaul communication link 110c and determine priorities for the network data packets based on the characteristics. The priorities can represent an importance of the network data packets being delivered. A higher priority can represent a higher importance, and therefore, network data packets of higher importance might be provided fronthaul communication links and backhaul communication links to and from their corresponding client device that have a higher throughput, reliability, or other metric corresponding to quality of a communication link. For example, in FIG. 4, satellite node 125b can determine that the network data packets on fronthaul communication link 105a have a higher priority than the network data packets on fronthaul communication link 105b and backhaul communication link 110c. If fronthaul communication link 105b uses a channel that might be better for fronthaul communication link 105a, then satellite node 125b can switch fronthaul communication link 105a to use that channel (e.g., switch from channel C to channel A as depicted in FIG. 4) and provide data on backhaul communication link 110c to instruct satellite node 125a to change the channel of fronthaul communication link 105b to channel C from channel A. Fronthaul communication link 105b can be changed because the network data packets with the higher priority are not provided to satellite node 125a and on to client device 120b.

Figure 5:
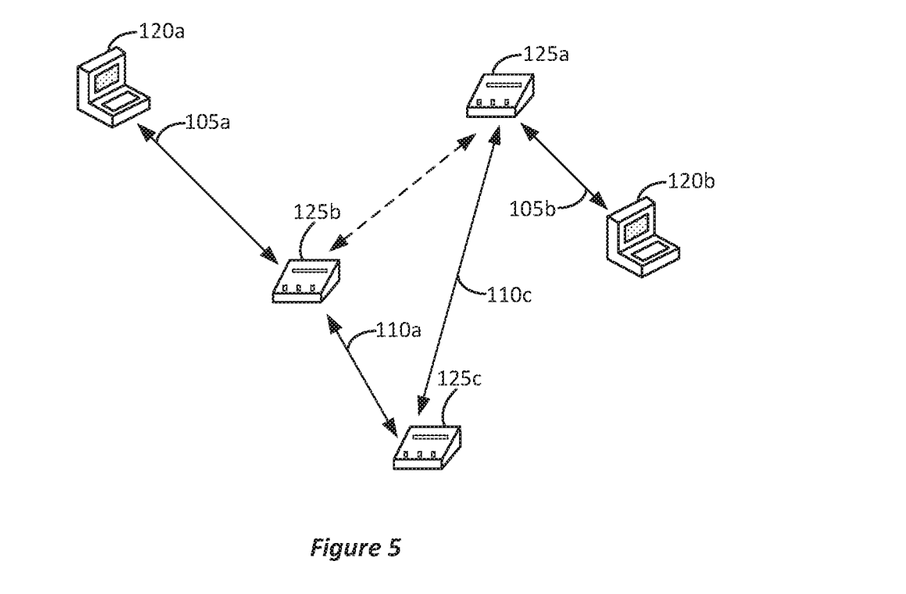
FIG. 5 illustrates an example of changing a topology of a wireless mesh network based on characteristics of network data packets.

As previously discussed, the topology of the wireless mesh network can be changed in response to the determined characteristics of the network data packets, FIG. 5 illustrates an example of changing a topology of a wireless mesh network based on characteristics of network data packets. In FIG. 5, backhaul communication link 110c has been changed (in contrast to FIG. 4) from between satellite node 125a and satellite node 125b to between satellite node 125a and satellite node 125c. That is, instead of network data packets for client device 120b being transmitted through satellite node 125b, backhaul communication link 110c can be established between satellite node 125a and satellite node 125c instead such that the network data packets for client device 120b are not routed through satellite node 125b (i.e., the previous communication link can be disconnected). As a result, the topology of the wireless mesh network implemented by the communication links between the nodes can be changed based on the characteristics of the network data packets. This may be performed to improve the performance of fronthaul communication link 105a, for example, by reducing interference caused by backhaul communication link 110c if it is established between the prior satellite nodes.

In some implementations, multiple backhaul communication links between satellite nodes may be available. For example, two backhaul communication links can be available between satellite node 125a and satellite node 125c. One of the two backhaul communication links can be selected to provide network data packets on based on the characteristics of the network data packets as discussed above.

Figure 7:
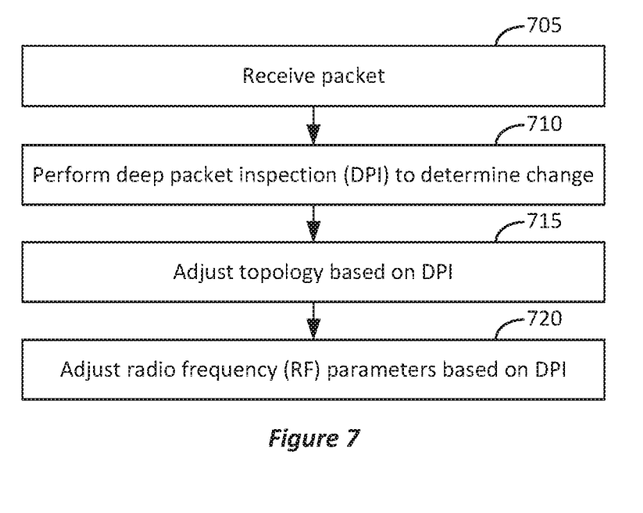
FIG. 7 illustrates an example of using deep packet inspection (DPI).

FIG. 7 illustrates an example of using deep packet inspection (DPI). In FIG. 7, at block 705, a packet can be received. For example, one of access point node 130 or satellite nodes 125a-c in FIG. 1 can receive a packet having a header and payload. At block 710, deep packet inspection (DPI) can be performed to determine changes in the packets. For example, the payload of the packet can be analyzed using regular expressions to determine patterns within the data of the payload. Regular expression methods include string matching, character sets and wildcards, character repetition, character sets and wild card repetitions, and constraints based on counting can be performed. In other examples, matching can be based on compressed deterministic automata or non-deterministic finite automata (DFA or NFA, respectively). In another example, dual finite automata (dual FA) can be used. If the data of the payload changes to have a type of pattern and this is determined, then at block 715, the topology of the mesh network can be changed. For example, the backhaul communication links between access points can be changed, as discussed elsewhere herein. At block 720, the radio frequency (RF) parameters can also be changed based on the DPI. For example, the channel or band used for a fronthaul or backhaul communication link can be changed as discussed elsewhere herein.

Figure 6:
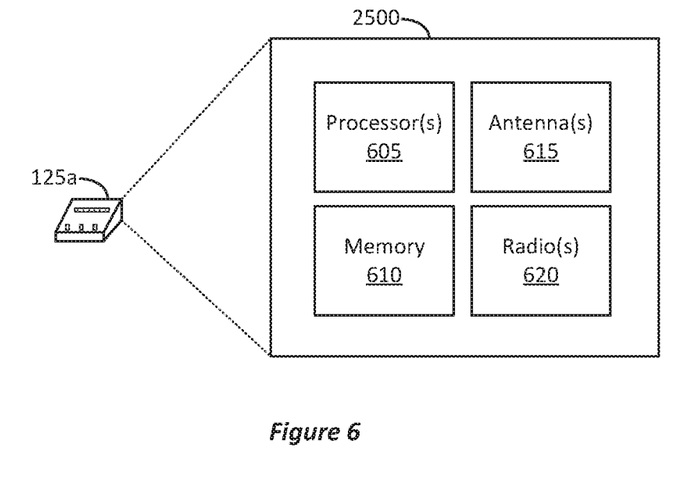
FIG. 6 illustrates an example of a simplified block diagram of an electronic device which may be used with particular implementations.

FIG. 6 illustrates an example of a simplified block diagram of an electronic device which may be used with particular implementations. For example, FIG. 6 portrays a high-level block diagram illustrating a processing device 2500 implementing satellite node 125a in which at least some operations described herein can be implemented. In some implementations, the block diagram can also implement the other devices described herein, such as access node 130. The processing system can be a system that can run any of the methods/algorithms/techniques described above.

In the illustrated embodiment, the processing device 2500 includes one or more processors 605, memory 610, antenna 615, and one or more radios 620. Processors 605 may be or include, for example, one or more general-purpose programmable microprocessors or microprocessor cores, microcontrollers, application specific integrated circuits (ASICs), programmable gate arrays, or the like, or a combination of such devices. The processor(s) 605 control the overall operation of the processing device 2500. Memory 610 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 610 may store data and instructions that configure the processor(s) 605 to execute operations in accordance with the techniques described above. Processing device 2500 can also include communication devices that may be or include, for example, an Ethernet adapter, cable modem, Wi-Fi adapter, cellular transceiver, Bluetooth transceiver, or the like, or a combination thereof. Depending on the specific nature and purpose of the processing device 2500, it can also include I/O devices that can include devices such as a display (which may be a touch screen display), audio speaker, keyboard, mouse or other pointing device, microphone, camera, etc. Processing device 2500 can also include radios 620, for example, a different radio for each band that communication links can be established within. Processing device 2500 can also include one or more antennas 615 for aiding the establishing of the communication links. For example, radio 620 can generate a signal that is transmitted via antenna 615.

While processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations, or may be replicated (e.g., performed multiple times). Each of these processes or blocks may be implemented in a variety of different ways. In addition, while processes or blocks are at times shown as being performed in series, these processes or blocks may instead be performed in parallel, or may be performed at different times. When a process or step is "based on" a value or a computation, the process or step should be interpreted as based at least on that value or that computation.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

Physical and functional components (e.g., devices, engines, modules, and data repositories, etc.) associated with processing device 2500 can be implemented as circuitry, firmware, software, other executable instructions, or any combination thereof. For example, the functional components can be implemented in the form of special-purpose circuitry, in the form of one or more appropriately programmed processors, a single board chip, a field programmable gate array, a general-purpose computing device configured by executable instructions, a virtual machine configured by executable instructions, a cloud computing environment configured by executable instructions, or any combination thereof. For example, the functional components described can be implemented as instructions on a tangible storage memory capable of being executed by a processor or other integrated circuit chip. The tangible storage memory can be computer readable data storage. The tangible storage memory may be volatile or non-volatile memory. In some embodiments; the volatile memory may be considered "non-transitory" in the sense that it is not a transitory signal. Memory space and storages described in the figures can be implemented with the tangible storage memory as well, including volatile or non-volatile memory.

Each of the functional components may operate individually and independently of other functional components. Some or all of the functional components may be executed on the same host device or on separate devices. The separate devices can be coupled through one or more communication channels (e.g., wireless or wired channel) to coordinate their operations. Some or all of the functional components may be combined as one component. A single functional component may be divided into sub-components, each sub-component performing separate method step or method steps of the single component.

In some embodiments, at least some of the functional components share access to a memory space. For example, one functional component may access data accessed by or transformed by another functional component. The functional components may be considered "coupled" to one another if they share a physical connection or a virtual connection, directly or indirectly, allowing data accessed or modified by one functional component to be accessed in another functional component. In some embodiments, at least some of the functional components can be upgraded or modified remotely (e.g., by reconfiguring executable instructions that implements a portion of the functional components). Other arrays, systems and devices described above may include additional, fewer, or different functional components for various applications.

While embodiments have been described in the context of fully functioning computers, those skilled in the art will appreciate that the various embodiments are capable of being distributed as a program product in a variety of forms and that the disclosure applies equally, regardless of the particular type of machine or computer-readable media used to actually effect the embodiments.

From the foregoing, it will be appreciated that specific embodiments of the invention have been described herein for purposes of illustration, but that various modifications can be made without deviating from the scope of the invention. Accordingly, the invention is not limited except as by the appended claims.

We claim:

1. A method for adjusting communication links of a wireless mesh network, comprising:
    performing, by a first computing node of the wireless mesh network, a deep packet inspection (DPI) to determine changes in data of one or more payloads of network data packets associated with a first client device of the wireless mesh network;
    determining, by the first computing node, characteristics of the network data packets including whether the data of the one or more payloads changes to a type of pattern, the wireless mesh network having a topology including a first fronthaul communication link between the first computing node and the first client device and a first backhaul communication link between the first computing node and a second computing node of the wireless mesh network; and
    changing, by the first computing node, the topology of the wireless mesh network based on the characteristics of the network data packets including whether the data of the one or more payloads changes to the type of pattern.

2. The method of claim 1, wherein changing the topology of the wireless mesh network includes establishing a least one of a second backhaul link between the first computing node and a third computing node or a third backhaul link between the second computing node and the third computing node and disconnecting the first backhaul communication link between the first computing device and the second computing device.

3. The method of claim 2, wherein changing the topology of the wireless mesh network includes establishing a second backhaul link between the first computing node and the third computing node, establishing the third backhaul link between the second computing node and the third computing node, and disconnecting the first backhaul communication link between the first computing device and the second computing device.

4. The method of claim 1, wherein changing the topology of the wireless mesh network includes changing the first backhaul communication link from establishing a communication link between the first computing node and the second computing node to a communication link between the second computing node and a third computing node.

5. The method of claim 1, wherein changing the topology of the wireless mesh network includes adding a third computing node to the first backhaul communication link between the first computing node and the second computing node.

6. The method of claim 1, wherein changing the topology of the wireless mesh network includes changing the first backhaul communication link to improve performance of the first fronthaul communication link.

7. The method of claim 1, wherein changing the topology of the wireless mesh network includes establishing at least one of another backhaul communication link or another fronthaul communication link to improve performance of the wireless mesh network.

8. The method of claim 1, wherein changing the topology of the wireless mesh network includes changing the first backhaul communication link to reduce interference caused by the first backhaul communication link on the first fronthaul communication link.

9. The method of claim 1, wherein changing the topology of the wireless mesh network includes disconnecting the first backhaul communication link from between the first computing node and the second computing node to improve the performance of the wireless mesh network.

10. The method of claim 1, wherein changing the topology of the wireless mesh network includes replacing the first backhaul communication link with a second backhaul communication link with a third backhaul communication node.

11. The method of claim 1, wherein changing the topology of the wireless mesh network includes switching among a frequency band or a frequency channel of the first fronthaul communication link and the first backhaul communication link.

12. The method of claim 1, wherein the characteristics include one or more of a type of the first client device, a type of application corresponding to the network data packets, or a time duration of the application corresponding to the network data packets, the application representing how the network data packets are to be used by the first client device.

13. The method of claim 1, wherein the DPI is based on performing regular expression matching on the network data packets.

14. The method of claim 13, wherein the regular expression matching is based on automata.

15. The method of claim 13, wherein performing the DPI comprises:
performing regular expression matching on the network data packets including string matching, character sets and wildcards, character repetition, character sets and wild card repetitions, or constraints based on counting.

16. An electronic device, comprising:
one or more processors; and
memory storing instructions, wherein the processor is configured to execute the instructions such that the processors and memory are configured to:
perform a deep packet inspection (DPI) to determine changes in data of one or more payloads of network data packets associated with a first client device of a wireless mesh network;
determine characteristics of the network data packets including whether the data of the one or more payloads changes to a type of pattern, the wireless mesh network having a topology including a first fronthaul communication link between a first computing node and the first client device and a first backhaul communication link between the first computing node and a second computing node of the wireless mesh network; and
change the topology of the wireless mesh network based on the characteristics of the network data packets including whether the data of the one or more payloads changes to the type of pattern.

17. The electronic device of claim 16, wherein changing the topology of the wireless mesh network includes establishing a second backhaul link between the first computing node and a third computing node and establishing a third backhaul link between the second computing node and the third computing node.

18. The electronic device of claim 16, wherein changing the topology of the wireless mesh network includes adding a third computing node to the first backhaul communication link between the first computing node and the second computing node.

19. The electronic device of claim 16, wherein changing the topology of the wireless mesh network includes switching among a frequency band or a frequency channel of the first fronthaul communication link and the first backhaul communication link.

20. The electronic device of claim 16, wherein the characteristics include one or more of a type of the first client device, a type of application corresponding to the network data packets, or a time duration of the application corresponding to the network data packets, the application representing how the network data packets are to be used by the first client device.

* * * * *